Figure 1:
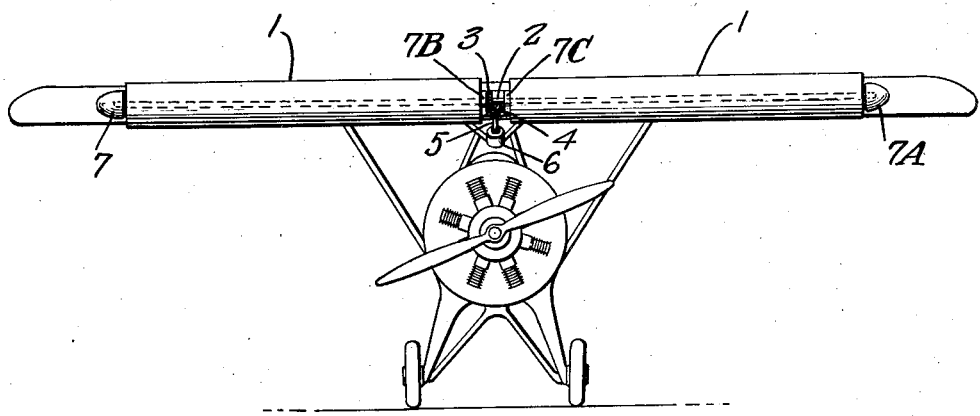

March 22, 1932.  A. J. EVANS  1,850,925

ROTATING POWER DRUM FOR AIRPLANES

Filed March 17, 1930

Arthur J. Evans,
INVENTOR

BY Victor J. Evans
and Co. ATTORNEYS

WITNESS:

Patented Mar. 22, 1932

1,850,925

UNITED STATES PATENT OFFICE

ARTHUR J. EVANS, OF COLUMBUS, NEW MEXICO

ROTATING POWER DRUM FOR AIRPLANES

Application filed March 17, 1930. Serial No. 436,623.

This invention relates to a combination of a rotating power drum, parallel to and acting in conjunction with the wing or the wing and tail of an airplane, or other craft.

The primary and most important object of my invention is to provide a new, useful and novel means of furnishing additional power for lifting, raising, propelling and landing airplanes and other craft; providing greater cargo or load lifting and carrying capacity; increasing the speed of airplanes vastly over that now possible; making air travel and air navigation safer and easier and greatly decreasing the weight and size of motors used in aircraft thus making possible a great saving in expense of operation, fuel consumption, etc., as well as making more space available for useful load because of the smaller motors which my invention will make possible.

A further important object of my invention is the provision of a new, useful and novel device to be installed on airplanes and other aircraft of all types, kinds and sizes, the mechanism being so constructed that the lifting power as well as the power and speed in forward movement will be greatly enhanced and the stabilization and balance of the plane made more even, certain and continuous by installing the device and devices herein described on said aircraft:

My invention consists of an elongated drum to be constructed of any light, strong metal or other suitable material and is mounted upon and forwardly of the wing or wings of an airplane in a manner to be approximately parallel with the forward edge of said wing and one or more drums may be employed, but in any event the drum or drums are mounted for rotation through the instrumentality of brackets or the like equipped with bearings, the brackets being of any suitable type and may be formed integral with the wing or wings.

The drum or drums are equipped with gears and said gears are in turn connected by a drive shaft to a separate power plant carried in or on said plane in such a position as to be readily accessible to the pilot's seat, said power plant being an electric motor or other small motor which may be started and operated at will by the pilot, either in conjunction and simultaneously with the motor or motors of the plane itself or separately and independently thereof and either in the air or on the ground, either moving or stationary.

When it is desired to use this device the pilot of the plane will simply start his separate power plant or motor which will start the power drum revolving, the speed thereof being regulated at will be the pilot within the limitations of the motor used and this rotation or revolution will start an air current which, according to the well known laws of physics will greatly increase the lifting power of said plane; make a quicker "hop-off", enable the plane to rise from the ground into the air in a shorter distance and more vertically, enable the plane to lift and carry a greater load, stabilize it in the air and on the ground, make possible a "take-off" at far lower speeds than is now possible and make landing at far lower speed possible. In addition to these advantages and improvements, my invention will make possible the use of much smaller and less powerful motors than are now in use in aircraft thus saving the cost of installation of the larger motors, saving in fuel consumption, saving in weight so as to enlarge the available cargo space and increase the useful load that may be carried. An important advantage of my invention will be the great increase in the safety factor, this device making it possible for the pilot, in the event of motor trouble developing in his regular motors, to cruise for an indefinite time or distance while said regular motors are being repaired or until he finds a landing place and then to land safely at low speed without the use of his other motors, this device tending to prevent "nose dives" keeping the nose of the plane up and relieving the shock of landing tending to keep the plane on an even keel and add to the balance of same.

One form of my invention is illustrated in the accompanying drawings, in which Figure 1 is a front view of my device and auxiliary devices mounted on an airplane of the monoplane or single wing type and ready to use.

Figure 2:
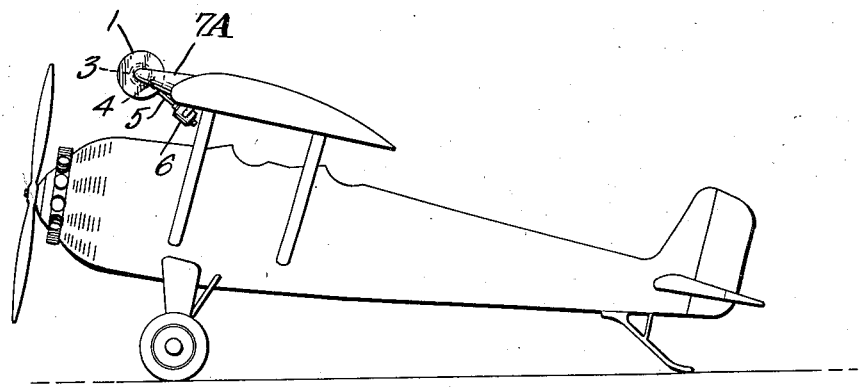

Figure 2 is a general side-view of the same device mounted on the same type plane as in Figure 1.

The method of construction of, and the principle upon which my invention operates is as follows:

Referring to the drawings in detail, the reference numeral 1 indicates one of a pair of aligned drums having their confronting faces arranged in spaced relation with respect to each other, and these drums are mounted forwardly of the wing or wings of the plane. Passing through and arranged longitudinally and centrally of the drums is a shaft 2 which has its outer ends projecting from the outer ends of the drums and mounted for rotation in bearings disposed within supporting means in the form of brackets 7 and 7A which as shown are formed integral with the wing and are hollow to accommodate the bearings for the outer ends of the shaft 2. The inner faces of the brackets 7 and 7A are flat and are provided with openings to receive the outer ends the shaft 2, while the remaining portions of the brackets are disposed at an inclination and merge into the wings as clearly shown in Figure 1.

Secured to the wing centrally thereof or to other suitable supporting means is a substantially U-shape bracket which includes upstanding arms 7B and 7C that rotatably receives the portion of the shaft 2 that extends between the inner ends of the drums, and this bracket supports the inner portion of the shaft as will be apparent. The portion of the shaft 2 which extends between the drums 1 has secured thereto a bevel gear 3 which meshes with the bevel gear 4 secured to the upper end of a drive shaft 5, the latter having suitable connection with a motor 6 for the purpose of driving the shaft 5 to impart rotation to the drums 1 through the instrumentality of the gears 3 and 4 and the shaft 2 which is fixed to the drums 1.

When the small separate power plant or motor 6 is started, drive shaft 5 at the end of which is gear 4 immediately enmeshes and engages with gear 3 on rotating drum shaft or axis 2 with the result that drums 1 rotate or revolve in the bearings contained within bearing supports 7 and 7A, thus creating an air current with tremendous lifting and some pulling power and tending to greatly stabilize and steady the plane in flight as well as in take-off and landing.

The drawings show only one form of the invention and one type of construction, i. e., a pair of drums rotating on a single axis in the one direction, and stationary as to adjustment.

The drums can be provided with independent shafts operated accordingly by alternating motors and gears, or reversible motors and gears, and the drums by being so mounted can be rotated independently, and in opposite directions.

The supports or arms 7 and 7A within which are contained the bearings which support the axis ends of the drum and allow it to rotate can also be made adjustable, either up and down or out and in, thus placing the drum either below or above the plane wing or near to its edge or far away from its edge as the exigencies of the situation may demand, this adjustment feature being so arranged as to enable the pilot to make the adjustment easily from his seat in the cockpit such as the gears of an automobile are shifted, thus providing for varying loads and balances caused by them and different weather conditions.

I claim as new:

In an aircraft, a pair of cylindrical drums mounted for rotation, brackets formed with the aircraft and being provided with flat inner faces having openings arranged therein, the remaining portions of said brackets being inclined and merging into the aircraft, a shaft extending through said drums centrally and longitudinally thereof and having their outer ends mounted through the openings, bearings arranged in said brackets to accommodate the outer ends for rotation therein, said drums being aligned with their inner ends disposed in spaced relation with respect to each other, said shaft bridging the space between the inner ends, a substantially U-shaped bracket secured to the aircraft and having upstanding arms provided with bearing openings to accommodate the shaft for rotation, means for rotating the shaft and means for controlling the rotating means.

ARTHUR J. EVANS.